US008401926B2

(12) United States Patent
Benzon

(10) Patent No.: US 8,401,926 B2
(45) Date of Patent: Mar. 19, 2013

(54) SYSTEM FOR TRACKING THE SUCCESSFUL RECOMMENDATION OF A GOOD OR SERVICE

(75) Inventor: Roland Benzon, Pesig (PH)

(73) Assignee: Chikka Pte Ltd, Singapore (SG)

( * ) Notice: Subject to any disclaimer, the term of this patent is extended or adjusted under 35 U.S.C. 154(b) by 532 days.

(21) Appl. No.: 12/593,610

(22) PCT Filed: Mar. 28, 2008

(86) PCT No.: PCT/SG2008/000102
§ 371 (c)(1),
(2), (4) Date: Sep. 28, 2009

(87) PCT Pub. No.: WO2008/118104
PCT Pub. Date: Oct. 2, 2008

(65) Prior Publication Data
US 2010/0121774 A1    May 13, 2010

(30) Foreign Application Priority Data
Mar. 28, 2007    (SG) ................ 200702355-9

(51) Int. Cl.
*G06Q 30/00*    (2006.01)
(52) U.S. Cl. ...................................... 705/26.7
(58) Field of Classification Search ........ 705/26.1–27.2, 705/51–59
See application file for complete search history.

(56) References Cited

U.S. PATENT DOCUMENTS 7,865,522 B2 * 1/2011 Purdy et al. ............. 707/790
7,970,922 B2 * 6/2011 Svendsen .............. 709/231
2002/0069116 A1 * 6/2002 Ohashi et al. ........... 705/26
2005/0261976 A1   11/2005 Suzuki
2008/0270561 A1 * 10/2008 Tang et al. .............. 709/207

FOREIGN PATENT DOCUMENTS

WO    WO2007/003045    1/2007

OTHER PUBLICATIONS

Power to the People: Do it Yourself Content Distribution Salz, Peggy Anne EContent v28n6 pp. 36-41 Jun. 2005.*
WIPO, International Search Report of the International Search Authority for corresponding International Application No. PCT/SG2008/000102.
WIPO, Written Opinion dated May 8, 2008 of the International Search Authority for corresponding International Application No. PCT/SG2008/000102.
WIPO, Second Written Opinion dated Feb. 17, 2009 of the International Search Authority for corresponding International Application No. PCT/SG2008/000102.
WIPO, Third Written Opinion dated Apr. 30, 2009 of the International Search Authority for corresponding International Application No. PCT/SG2008/000102.
WIPO, International Preliminary Report on Patentability of the International Search Authority for corresponding International Application No. PCT/SG2008/000102.

* cited by examiner

*Primary Examiner* — William Allen
(74) *Attorney, Agent, or Firm* — Intellectual Property Law Group LLP

(57) ABSTRACT

Systems and methods for tracking the successful recommendation of goods or services are provided. A mobile phone-in the possession of a user is capable of sending and receiving communication messages, including recommendations. A first message is composed including a mobile phone number allocated to the mobile phone, a unique identifier of the recommender, and a reference code for a good or service. The first message is parsed, a referral record is created, and the results of the recommendation are recorded.

35 Claims, 2 Drawing Sheets

SYSTEM FOR TRACKING THE SUCCESSFUL RECOMMENDATION OF A GOOD OR SERVICE

FIELD OF THE INVENTION

The present invention relates to a system for tracking the successful recommendation of a good or service.

BACKGROUND TO THE INVENTION

The following discussion of the background to the invention is intended to facilitate an understanding of the present invention. It should be appreciated that the discussion is not an acknowledgment or admission that any of the material referred to was published, known or part of the common general knowledge in any jurisdiction as at the priority date of the application.

Marketing by consumer recommendation is an established practice for most businesses. However, the existing methods by which consumer recommendations can be tracked have their own problems.

For instance, in one system, when a new customer purchases a good or service, the new customer may be asked by the sales agent if they have been recommended to purchase the good or service by an existing customer. This system is problematic in that it relies:

a) on the sales agent remembering to ask the question;
b) on the customer to remember which existing customer recommended the good or service;
c) on the sales agent to correctly identify the existing customer as the recommender of the good or service.

It is only when all three of these factors exist can the recommender then be appropriately rewarded for the recommendation.

It is therefore an object of the present invention to overcome, at least in part, some or all of the aforementioned problems.

SUMMARY OF THE INVENTION

Throughout this document, unless otherwise indicated to the contrary, the frame "comprising", "consisting of", and the like, are to be construed as inclusive and not exhaustive.

In accordance with a first aspect of the invention there is a system for tracking the successful recommendation of a good or service comprising:
  a mobile phone in the possession of a receiver, the mobile phone capable of sending and receiving communication messages;
  a merchant system;
  at least one database; and
  an intermediary system
where, the intermediary system is in data communication with the at least one database and the merchant system and in communication with the mobile phone through a mobile telecommunications network and where, when a recommender accesses the merchant system and selects and recommends to the receiver a good or service provided by a merchant operating through the merchant system, the merchant system composes a first communication message to the intermediary system including the mobile phone number allocated to the mobile phone, a unique identifier of the recommender and a reference code for a good or service associated with the selected good or service and on receipt of the first communication message by the intermediary system, the intermediary system parses the first communication message to identify the separate information included therein; creates a new referral record including the unique identifier of the recommender, the mobile phone number allocated to the mobile phone and the reference code for the recommended good or service and stores the referral record in the at least one database; the intermediary system then operable to compose a recommendation message recommending the recommended good or service and send the recommendation message to the mobile phone using a phone number having a unique identification number; wherein on receipt of the recommendation message, if the receiver wishes to accept the recommendation they reply to the recommendation message with an appropriate acceptance response; and on receipt of the reply to the recommendation message the intermediary system takes steps as appropriate to deem the recommendation successful.

The reference code for the good or service associated with the selected good or service may be representative of the actual selected good or service. Alternatively, it might be represented of a subscription service associated with the actual selected good or service. In this manner, the merchant can obtain an on-going revenue stream.

The first communication message may also include a referral credit amount.

The intermediary system may determine whether the recommender is a new user of the system and, if so, create a referee record for the recommender and store it in the at least one database. Preferably, the referee record comprises the name and other identifying information of the recommender as well as a referral credit amount. In its most preferred embodiment, the identifying information includes a mobile phone number of the recommender and this operates as the primary key for the referee record.

The referral record may include further information such as the electronic mail address or other identifier of the merchant who is to provide the recommended good or service. It may also include details of the referral credit amount to be credited to the recommender on making a successful recommendation to the receiver.

The unique identification number may be composed from the concatenation of a common short code, the reference code and the mobile phone number of the recommender.

The deeming of a recommendation as successful may be achieved by referencing the corresponding referral record for the recommendation in the at least one database to determine the amount of applicable referral credit associated with the successful recommendation and crediting this amount to the referral credit amount of the recommender as recorded in the recommender's referee record.

The intermediary system may negotiate directly with the merchant for the provision of the recommended good or service to the receiver following a successful recommendation.

The reference code may be used in conjunction with one or more look-up tables to determine other information such as merchant details, referral credit amounts, etc.

The merchant system may be a standalone computer system accessible by direct connection, an intranet accessible via a computer network, or a website accessible via the internet.

In accordance with a second aspect of the invention there is a system for tracking the successful recommendation of a good or service comprising:
  a first mobile phone in the possession of a receiver, the first mobile phone capable of sending and receiving communication messages;
  a second mobile phone in the possession of a recommender, the second mobile phone capable of sending and receiving communication messages;

at least one database; and an intermediary system where, the intermediary system is in communication with the mobile phones through a mobile telecommunications network and where, when a recommender composes a first communication message including the mobile phone number allocated to the first mobile phone and a reference code associated with the good or service to be recommended and sends it to the intermediary system via a first shortcode, and on receipt of the first communication message by the intermediary system, the intermediary system parses the first communication message to identify the separate information included therein; creates a new referral record including the mobile phone number allocated to the second mobile phone and the reference code for the recommended good or service and stores the referral record in the at least one database; the intermediary system then operable to compose a recommendation message recommending the recommended good or service and send the recommendation message to the first mobile phone using a phone number having a unique identification number; wherein on receipt of the recommendation message, if the receiver wishes to accept the recommendation they reply to the recommendation message with an appropriate acceptance response; and on receipt of the reply to the recommendation message the intermediary system takes steps as appropriate to deem the recommendation successful.

The communication messages sent by the intermediary system to mobile phones may take the form of Short Messaging System (SMS) messages or Multimedia Messaging System (MMS) messages or other like messaging protocols. The method of communicating between the computational device and the intermediary system may be by way of electronic mail message or through web services or other like protocols.

Further aspects of the invention are directed to a method for tracking the successful recommendation of a good or service; the intermediary system and software on a computer-readable medium operable to allow a computer system to operate as an intermediary system.

BRIEF DESCRIPTION OF THE DRAWINGS

The following invention will be described with reference to the following drawings of which.

PREFERRED EMBODIMENTS OF THE INVENTION

Figure 1:
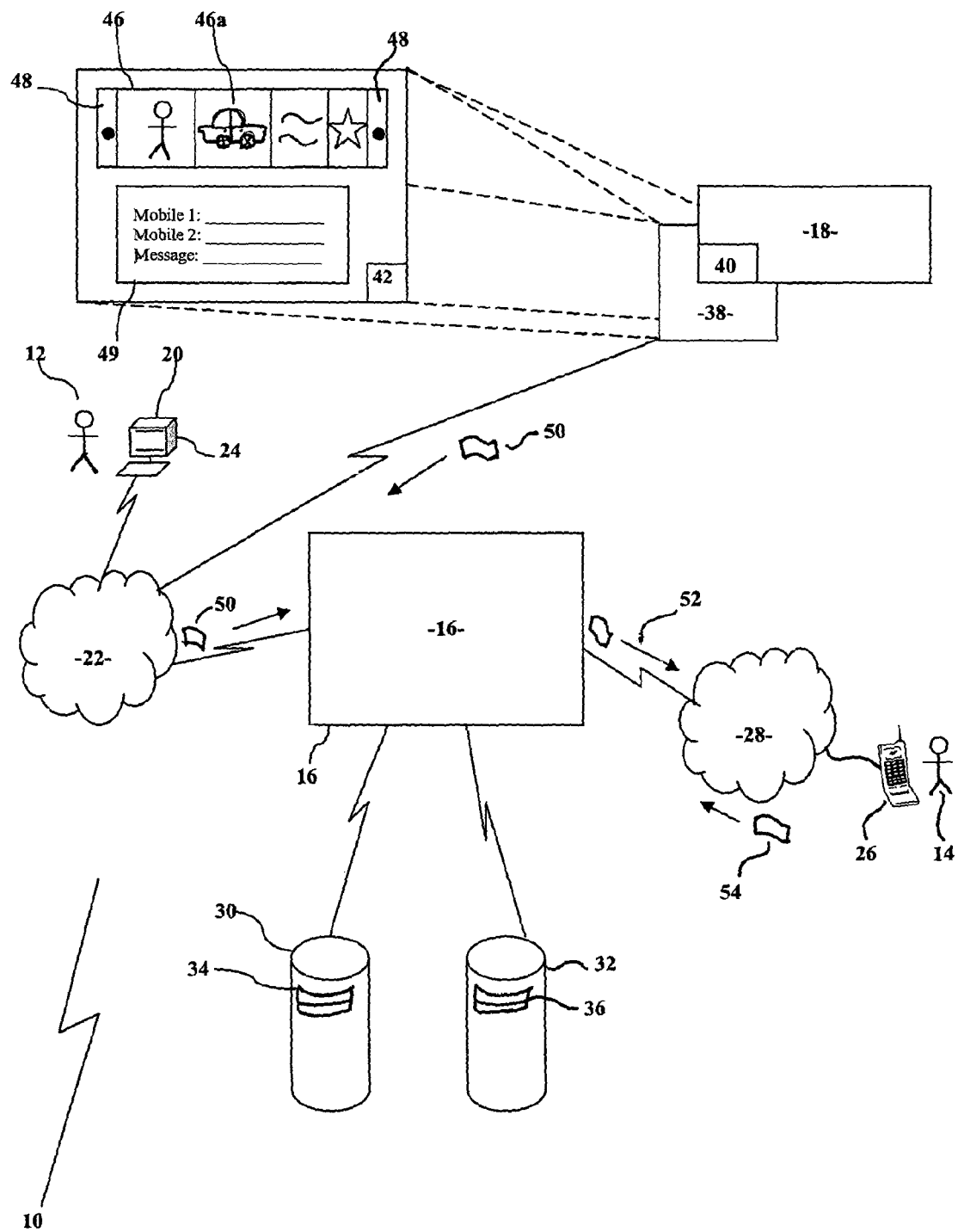
FIG. 1 is a schematic of a first embodiment of the invention.
Figure 2:
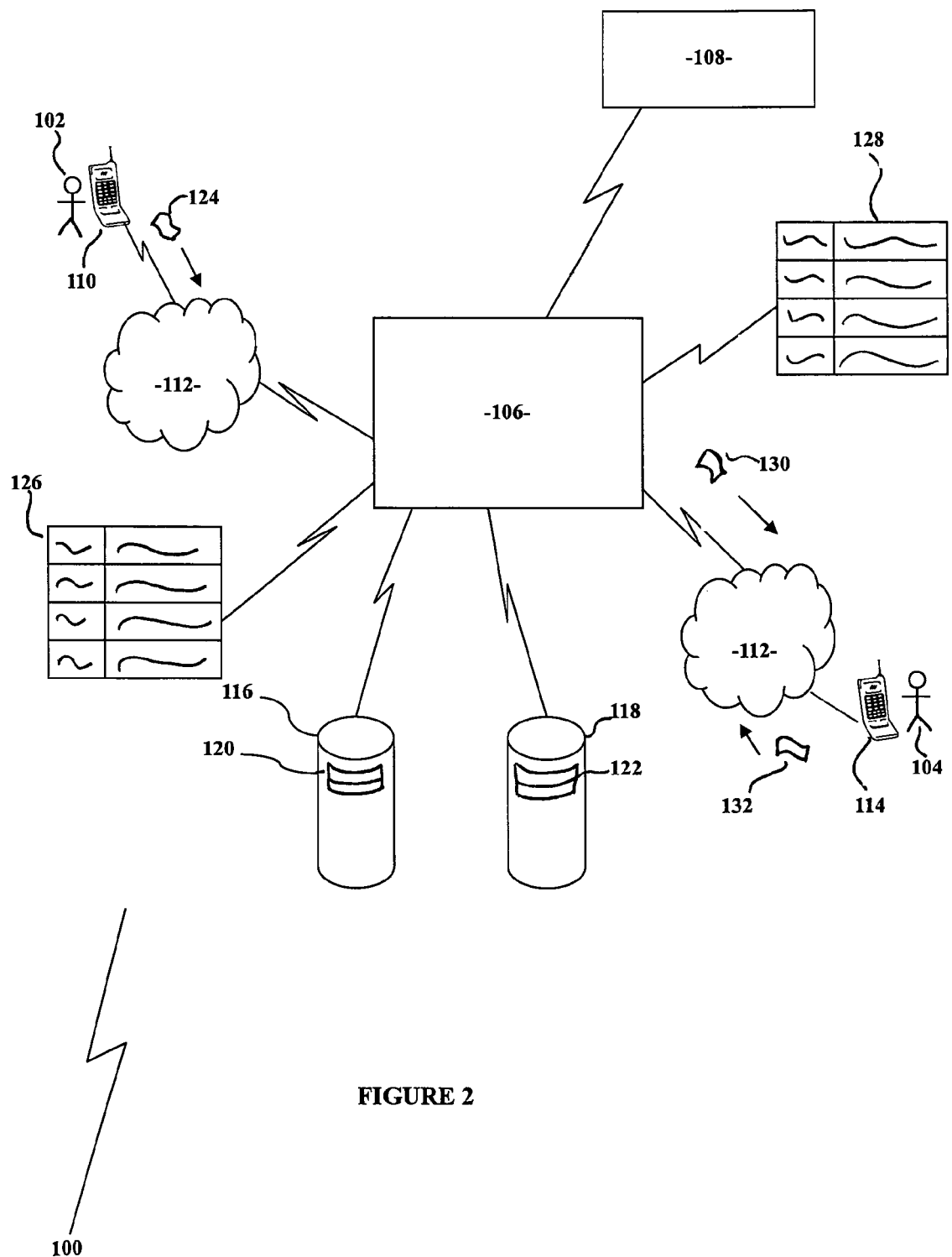
FIG. 2 is a schematic of a second embodiment of the invention.

In accordance with a first embodiment of the invention there is a system for tracking the successful recommendation of a good or service 10 comprising:

a recommender 12;

a receiver 14;

an intermediary system 16; and an external system 18.

The recommender 12 is in control of a computational device 20 connected to the internet 22. The computational device 20 is able to utilize the services of the internet through an internet browser 24.

The receiver 14 is in possession of a mobile phone 26. The mobile phone 26 is connected to a mobile phone network 28 which has messaging capabilities—in this instance Short Messaging System ("SMS") capabilities.

The intermediary system 16 is connected to both the internet 22 and the mobile phone network 28. In this capacity it is able to send and receive instant messages or electronic mail messages sent via the internet 22. The intermediary system is also able to send and receive SMS messages via the mobile phone network 28. The intermediary system 16 is in data communication with a referee database 30 and a referral database 32. The referee database 30 comprises a set of referee records 34. Similarly, the referral database 32 comprises a set of referral records 36.

Each referee record 34 comprises the name and other identifying information relating to a recommender 12 and their current referral credit balance. Each referral record 36 comprises:

the mobile phone number and other identifying information of the referred person;

the mobile phone number and other identifying information of the referee;

an identifier relating to a referred good or service;

details of the provider of the good or service; AND the referral credit applicable for referring the good or service to the referred person.

The external system 18 has stored thereon a computer program that, when executed, generates a website 38 accessible via the internet 22. The computer program includes a communications module 40, which is activated by way of a recommendation icon 42 that forms part of the website 38. The communications module 40 is in one-way communication with the intermediary system 16 via the internet 22.

This embodiment of the system will now be described in the context of the following example:

The recommender 12 uses their computational device 20 to connect to the internet 22. Once connected, the recommender 12 accesses the website 38 operated by the external system 18 via the internet browser 24.

The website 38 displays a product/service pane 44 and the recommendation icon 42. The website 38 may include additional features and information, however as such is beyond the scope of the present invention it will not be described here.

The product/service pane 44 displays a series of mobile phone pictures 46. The recommender 12 is able to move through the series of mobile phone pictures 46 by way of activation controls 48. Once the recommender 12 has reached the mobile phone picture 46 they wish to purchase for the receiver 14 using the activation controls 48, the recommender 12 selects the mobile phone picture 46a of their choice and moves it to the recommendation icon 42 using the commonly known "drag and drop" technique.

Once the mobile phone picture 46a has been dropped onto the recommendation icon 42, the website 38 initiates execution of the communications module 40.

On execution, the communications module 40 creates a form window 49. The form window 49 requests the recommender 12 to provide the following information:

their mobile phone number;

the mobile phone number of the receiver 14; and a personal message, if any, that the recommender 12 wants to pass on to the receiver 14 along with the recommendation.

While the recommender 12 is providing this information, the communications module 40 determines a reference code for the most appropriate good or service associated with the mobile phone picture 46a dropped onto the recommendation icon 42. In this case, the determined reference code relates to a subscription mobile phone picture service provided by the owner of the website 38. The communications module 40 then determines the referral credit amount associated with the determined reference code.

Once the communications module 40 has determined the appropriate reference code and referral credit amount and has been provided with the information requested of the recommender 12 by way of the form window, the communications module 40 packages all of this information; and the selected mobile phone picture 46a, into an electronic mail message 50. The electronic mail message 50 is then sent to an electronic mail address associated with the intermediary system 16.

On receipt of the electronic mail message 50, the intermediary system 16 parses the electronic mail message 50 to separately identify each item of information.

A check is then made with the referee database 30 to determine whether a referee record 34 exists for the recommender 12 (the check being performed on a mobile phone number comparison). If the check does not reveal a matching record, the intermediary system 16 operates to create a new referee record 34. The new referee record 34 is created using the mobile phone number of the recommender 12 as the primary key. The referral credit amount for the new referee record 34 is set to zero.

Irrespective of whether the recommender 12 already has a corresponding referee record 34 or not, the intermediary system 16 creates a new referral record 36 for storage in the referral database 32. The new referral record 36 is populated with the following data:
- the mobile phone number of the recommender 12 as provided in, the electronic mail message 50;
- the mobile phone number of the receiver 14 as provided in the electronic mail message 50;
- the reference code as provided in the electronic mail message 50, (acting as the identifier of the referred good or service);
- the electronic mail address or other identifier provided by the communications module 40 (acting as the details of the provider of the good or service); AND
- the referral credit amount as provided in the electronic mail message 50

At the same time, the intermediary system 16 compiles a SMS message 52. The SMS message 52 comprises three distinct portions, namely:
- a header portion;
- a content portion; and
- a footer portion.

The header portion contains the personal message the recommender 12 has generated for the receiver 14, if any, as designated in the electronic mail message 50. The content portion contains the mobile phone picture 46a as included in the electronic mail message. The footer portion contains a recommendation message. In this instance, the recommendation message is "If you would like to subscribe to our daily mobile phone picture service, reply YES to this message.". For this proposed example, all recommendation messages are activated by a single "YES" reply message.

Once the SMS message 52 has been compiled, the intermediary system 16 operates to generate a Unique Identifier Number ("UIN") from which the SMS message 52 will be sent. The UIN is generated by:
- including the number of the common short code used by the intermediary system 16;
- the reference code as provided in the electronic mail message 50; and
- the mobile phone number of the recommender 12.

The SMS message 52 is then sent to the receiver 14's mobile phone 26, via the mobile network 28, as if it originated from a person having the UIN as their mobile phone number. This is important, as this also acts to conceal, to some extent, the UIN from the receiver 14.

On receipt of the SMS message 52, the receiver 14 is free to deal with the mobile phone picture 46a as they see fit. On review of the recommendation message contained in the footer portion of the SMS message 52, the receiver 14 makes a decision as to whether they wish to subscribe to the mobile phone picture service or not. If they do not wish to subscribe, they need take no further action.

Alternatively, if they do wish to subscribe, the receiver 14 sends a reply message 54 to the SMS message 52. The reply message 54 simply contains the word "YES".

The reply message 54 is received by the intermediary system 16 through the same common short code used to send the SMS message 52. On receipt of the reply message 54, the intermediary system 16 analyses the message to determine:
- the mobile phone number used to send the reply message 54;
- the UIN; and
- the content of the reply message 54.

The intermediary system 16 further analyses the UIN to determine the reference code and the mobile phone number of the recommender 12.

With this information, the intermediary system 16 searches the referral database 32 for a referral record 36 having:
- the mobile phone number used to send the reply message 54 recorded as the mobile phone number of the receiver 14;
- the mobile phone number included as part of the UIN recorded as the mobile phone number of the recommender 12; AND
- the reference code included as part of the UIN recorded as the reference code.

On identification of the corresponding referral record 36, the intermediary system checks whether the receiver 14 has issued a valid recommendation response in the reply message 54. In this situation, this is done by verifying that the content of the reply message 54 contains only the word "YES". If the reply message 54 contains anything other than the word "YES", the recommendation is treated as declined and the corresponding referral record 36 is deleted from the referral database 32 by the intermediary system 16.

However, if the reply message 54 contains only the word "YES", the intermediary system 16 negotiates with the provider of the recommended good or service to provide such good or service. This is done using the electronic mail address or other identifier provided by the communications module 40 as a conduit for co-ordinating the provision of the good or service. As the terms for provision of the good or service are varied and beyond the scope of the present invention, they will not be addressed in more detail here.

At the same time, the intermediary system 16 operates to credit the referral credit amount as indicated in the corresponding referral record 36 to the current referral credit balance of the recommender's 12 corresponding referee record 34 in the referee database 30. Other techniques beyond the scope of the present invention may then be used to allow the recommender 12 to utilise their current referral credit balance.

In accordance with a second embodiment of the invention there is a system for tracking the successful recommendation of a good or service 100 comprising.
- a recommender 102;
- a receiver 104;
- an intermediary system 106; and
- an external system 108.

The recommender 102 is in control of a global system for mobile communication ("GSM") mobile phone 110. The GSM mobile phone 110 is connected to a mobile phone network 112 which has messaging capabilities—in this instance SMS capabilities. The receiver 104 is also in possession of a mobile phone 114 connected to the mobile phone network 112.

The intermediary system 106 is connected to the mobile phone network 112. In this capacity it is able to send and receive SMS messages via the mobile phone network 112. The intermediary system 106 is in data communication with a referee database 116 and a referral database 118. The referee database 116 comprises a set of referee records 120. Similarly, the referral database 118 comprises a set of referral records 122.

Each referee record 120 comprises the name and other identifying information relating to a recommender 102 and their current referral credit balance. Each referral record 122 comprises:
  the mobile phone number and other identifying information of the referred person;
  the mobile phone number and other identifying information of the referee;
  an identifier relating to a referred good or service;
  details of the provider of the good or service; AND
  the referral credit applicable for referring the good or service to the referred person.

This embodiment of the system will now be described in the context of the following example:

The recommender 12 is a subscriber to a mobile phone picture subscription service provided by the external system 108. Being a subscriber, the recommender 12 has, during the course of the subscription, received a promotional picture and instructions on how to recommend other people to the mobile phone picture subscription service. The instructions include a reference code.

To initiate the recommendation, the recommender 12 composes a MMS message 124 using the promotional picture as its basis. The recommender 12 adds a personal message to the MMS message 124 and the reference code as instructed. The MMS message 124 is then sent to a mobile phone number comprising of a short code operated by the intermediary system 106 and the number associated with the receiver's 104 mobile phone 114.

On receipt of the MMS message 124, the intermediary system 16 parses the electronic mail message 50 to separately identify:
  the reference code;
  the personal message;
  the promotional picture;
  the number of the recommender's 102 mobile phone 110 used to send the MMS message 124; AND
  the number of the receiver's 104 mobile phone 112.

A check is then made with the referee database 116 to determine whether a referee record 120 exists for the recommender 102 (the check being performed on a mobile phone number comparison). If the check does not reveal a matching record, the intermediary system 106 operates to create a new referee record 120. The new referee record 120 is created using the mobile phone number of the recommender 102 as the primary key. The referral credit amount for the new referee record 120 is set to zero.

Irrespective of whether the recommender 102 already has a corresponding referee record 120 or not, the intermediary system 106 creates a new referral record 122 for storage in the referral database 118. The new referral record 122 is immediately populated with the following data:
  the mobile phone number of the recommender 12 as identified in the MMS mail message 124;
  the mobile phone number of the receiver 14 as identified in the MMS mail message 124; AND
  the reference code as provided in the MMS message 124, (acting as the identifier of the referred good or service).

Using the reference code as a basis, the intermediary system 106 then checks two look-up tables. A check of the first look-up table 126 advises the intermediary system 106 of the electronic mail address or other identifier of the provider of the good or service to be recommended. A check of the second look-up table 128 determines the referral credit amount associated with the reference code.

The electronic mail address or other identifier of the provider of the good or service and the referral credit amount are then also added as data to the referral credit record 122.

Thereafter, the intermediary system 106 compiles a SMS message 130. The SMS message 130 comprises three distinct portions, namely:
  a header portion;
  a content portion; and
  a footer portion.

The header portion contains the personal message the recommender 102 has generated for the receiver 104, if any, as designated in the MMS message 124. The content portion contains the promotional picture as included in the MMS message 124. The footer portion contains a recommendation message. In this instance, the recommendation message is "If you would like to subscribe to our daily mobile phone picture service, reply YES to this message.". For this proposed example, all recommendation messages are activated by a single "YES" reply message.

Once the SMS message 130 has been compiled, the intermediary system 106 operates to generate a Unique Identifier Number ("UIN") from which the SMS message 130 will be sent. The UIN is generated by:
  including the number of the common short code used by the intermediary system 106;
  the reference code as provided in the MMS message 124; and
  the mobile phone number of the recommender 102.

The SMS message 130 is then sent to the receiver 104's mobile phone 114, via the mobile network 112, as if it originated from a person having the UIN as their mobile phone number. This is important, as this also acts to conceal, to some extent, the UIN from the receiver 104.

On receipt of the SMS message 130, the receiver 104 is free to deal with the promotional picture as they see fit. On review of the recommendation message contained in the footer portion of the SMS message 130, the receiver 104 makes a decision as to whether they wish to subscribe to the mobile phone picture service or not. If they do not wish to subscribe, they need take no further action.

Alternatively, if they do wish to subscribe, the receiver 104 sends a reply message 132 to the SMS message 130. The reply message 132 simply contains the word "YES".

The reply message 132 is received by the intermediary system 106 through the same common short code used to send the SMS message 130. On receipt of the reply message 132, the intermediary system 106 analyses the message to determine:
  the mobile phone number used to send the reply message 132;
  the UIN; and
  the content of the reply message 132.

The intermediary system 106 further analyses the UIN to determine the reference code and the mobile phone number of the recommender 102.

With this information, the intermediary system 106 searches the referral database 118 for a referral record 122 having:

the mobile phone number used to send the reply message 132 recorded as the mobile phone number of the receiver 104;

the mobile phone number included as part of the UIN recorded as the mobile phone number of the recommender 102; AND the reference code included as part of the UIN recorded as the reference code.

On identification of the corresponding referral record 122, the intermediary system checks whether the receiver 104 has issued a valid recommendation response in the reply message 132. In this situation, this is done by verifying that the content of the reply message 132 contains only the word "YES". If the reply message 132 contains anything other than the word "YES", the recommendation is treated as declined and the corresponding referral record 122 is deleted from the referral database 118 by the intermediary system 106.

However, if the reply message 132 contains only the word "YES", the intermediary system 106 negotiates with the provider of the recommended good or service to provide such good or service. This is done using the electronic mail address or other identifier recorded in the corresponding referral record 122 as a conduit for co-ordinating the provision of the good or service by the external system 108. As the terms for provision of the good or service are varied and beyond the scope of the present invention, they will not be addressed in more detail here.

At the same time, the intermediary system 106 operates to credit the referral credit amount as indicated in the corresponding referral record 122 to the current referral credit balance of the recommender's 102 corresponding referee record 120 in the referee database 116. Other techniques beyond the scope of the present invention may then be used to allow the recommender 102 to utilise their current referral credit balance.

It should be appreciated by the person skilled in the art that the present invention is not limited to the embodiments described. In particular the following additional features may be incorporated to form yet further embodiments:

Activation mechanisms may be used for the communications module 40 other than the recommendation icon 42 mentioned above. For instance, the communications module 40 may be activated by making a selection from a menu provided for on the website 38.

The communications module 40 may be stored on, and executed from, the recommender's 12 computational device 20. In a first version of this configuration, the communications module 40 may be activated by a toolbar icon or by right-clicking on an object representative of a good or service to be recommended. In a second version of this configuration, the communications module 40 may take the form of a Java™ plug-in, or a similar applet, for the internet browser 24 which can be activated in a similar manner to that described in the last sentence.

The footer portion of the SMS message 52 may advise the receiver 14 to direct their reply message 54 to the good or service provider rather than the intermediary system 16. In this configuration, the good or service provider is required to identify a recommendation as having been provided by the recommender and thereafter co-ordinate the crediting of the appropriate referral credit amount to the current referral credit balance of the recommender's 12 corresponding referee record 34 in the referee database 30.

Alternatively, the footer portion of the SMS message 52 may advise the receiver 14 to direct their reply message 54 to another mobile phone number utilized by the intermediary system 16. This is particularly important in situations where the intermediary system 16 is unable to use short codes to send and receive SMS messages. In such a situation, the other information used to form the UIN may need to be incorporated into the SMS message 52 and reply message 54 to appropriately deal with successful recommendations.

In the first embodiment of the invention, the intermediary system 16 may have a look-up table which shows the amount of referral credit associated with a particular referral code. Where this is implemented, there is no need for the communications module 40 to send the referral credit amount as part of the electronic mail message 50. This also allows the intermediary system 16 to increase or decrease the referral credit associated with a particular referral code in accordance with the promotional wishes of the good or service provider.

The intermediary system 16 may be run and operated by the good or service provider. In this situation, co-ordination of the provision of the good or service is simplified as the entity is in essence co-ordinating with itself. Furthermore, the intermediary system 16 may host the website 38 which would then eliminate the need for the communications program to send an electronic mail message 50. Communication of the required information otherwise provided by the electronic mail message 50 is then provided by internal communication messages.

The system 10 as described above may be modified to allow for on-going referral credits to be accumulated by a recommender 12 on successful recommendation of a receiver 14 to a subscription service.

The first embodiment of the invention may be modified such that the communications module 40 is embedded as part of another program, such as an instant messenger program. In the context of the example given in the first embodiment, the recommender 12 may use the drag and drop technique to move the mobile phone picture 46*a* to the receiver's 14 contact details as provided for by the instant messenger program. The instant messenger program then communicates the required, information to the intermediary system 16 by way of an instant message rather than be electronic mail message 50.

The referee database 30 and referral database 32 may be implemented as separate or related tables in a single database.

While the intermediary system 16 and external system 18 have been described in the above context as single computers, the functions of these systems may be performed by one or more clusters of computers that may be co-located or remote to one another.

The intermediary system 16 may have a further look-up table consisting of a reference code and a footer code. In this respect, on receipt of the electronic mail message 50 the intermediary system 16 can determine the appropriate footer code form the reference code provided as part of the electronic mail message 50. The determined footer code can then be used to identify the appropriate footer portion to be sent to the receiver 14 as part of the SMS message 52 and the appropriate response necessarily to be provided in the reply message 54 to validate a successful recommendation.

The processing steps as have been described above are only indicative systems of how the invention may be implemented. For example, in situations where the computational device 20, intermediary system 16 and external system 18 operate in a multi-processor or multi-threading environment, the processing steps may be re-ordered or otherwise amended to allow for parallel processing.

The referral credit amount may be redeemable for cash or cash-equivalent. Alternatively it may take the form of pre-paid credit for a good or service (such as pre-paid mobile phone credit). In yet further alternatives it may take the form of points in a loyalty points scheme or a gift of a particular good or service.

The computational device 20 may take the form of a WAP enabled mobile phone; a personal digital assistant, a Blackberry™ device as available from Research in Motion Limited of Ontario, Canada, or a notebook or desktop computer.

Message protocols other than those mentioned may be used in place to send communication messages between the intermediary system 16, 106 and mobile phones 26, 110, 114.

Automated systems executable on the computational device 20 may operate to automatically complete part or all of the information requested by the external system 18 via form window 48.

The website 38 and access thereto by the internet browser 24 may be replaced by more simplified systems as would be known to the person skilled in the art, such as a server and remoter terminal application. This then negates the need for the computational device 20 to be connected to the internet 22 as communication may be by way of direct telephone connection.

Error-processing techniques may be employed by the intermediary system 16 or good or service provider where the receiver has sent a reply message 54 that is not in conformance with the reply necessary to verify a successful recommendation. For example, in the context of the examples provided above, the receiver 14 sends a reply message with the text "YSE" instead of "YES".

The intermediary system 16 may periodically delete referral records 36 where the referral has not been accepted within a predetermined time period.

The intermediary system 16 may operate to keep all referral records 36 and introduces a further discriminator field, such as time of recommendation, to distinguish which referral has been successful in situations where a recommender has referred the same good or service to the same receiver multiple times.

There is no requirement for the content portion of the electronic mail message 50 or MMS message 124 be populated. In fact, in some instances, there may be no need for the electronic mail message 50 or MMS message 124 to have a content portion. This will of course, affect the processing of the systems 10, 100 as described in the examples above.

In alternative embodiments, it may not be necessary for the communications module 40 or recommender 102 to send a referral code as part of electronic mail message 50, or MMS message 124, as appropriate. In this situation, the communications module 40 or intermediary system 16, 106 may determine an appropriate referral code based on the content portion of the electronic mail message 50 or MMS message 124 as appropriate. For instance, as set out in the examples provided above, the communications module 40 or intermediary system 16 may identify a referral code for a mobile phone picture subscription service based on the fact that the content portion of the electronic mail message 50/MMS message 124 contains a mobile phone picture.

In the second embodiment described above, the MMS message 124 may be sent to the short code alone with either the number of the mobile phone 114 possessed by the receiver 104 or the receiver 104's instant messaging alias being included as part of the MMS message 124.

Communication between the external system 18 and the intermediary system 16 may be through web services in place of electronic mail message 50.

The recommender 12 may use the computational device 20 to directly connect to the external system. Alternatively, the recommender 12 may use the computational device 20 to connected to the external system through a computer network operating as an intranet.

The above embodiments may be modified such that unique recommendation session identifiers are used as primary keys. In doing so, some of the communications between parties of the system may be simplified to include just the recommendation session identifier.

It should be further appreciated by the person skilled in the art that the features described above, where not mutually exclusive, can be combined to form yet further embodiments of the invention.

I claim:

1. A system for tracking the successful recommendation of a good or service comprising:
   a mobile phone in the possession of a receiver, the mobile phone capable of sending and receiving communication messages;
   a merchant system;
   at least one database; and
   an intermediary system, the intermediary system in data communication with the at least one database and the merchant system and in communication with the mobile phone through a mobile telecommunications network;
   wherein the merchant system is accessible by a recommender to select and recommend to the receiver a good or service provided by a merchant operating through the merchant system, the merchant system configured to compose a first communication message to the intermediary system including the mobile phone number allocated to the mobile phone, a unique identifier of the recommender and a reference code for a good or service associated with the selected good or service;
   the intermediary system being operable to:
      parse the first communication message to identify the separate information included therein;
      create a new referral record including the unique identifier of the recommender, the mobile phone number allocated to the mobile phone and the reference code for the recommended good or service;
      store the referral record in the at least one database; and
      compose a recommendation message recommending the recommended good or service and send the recommendation message to the mobile phone using a phone number having a unique identification number;
   wherein, if the receiver wishes to accept the recommendation they can reply to the recommendation message with an appropriate acceptance response, the intermediary system being operable to take steps as appropriate to deem the recommendation successful responsive to the reply to the recommendation message.

2. A system according to claim 1, where the first communication message includes a referral credit amount.

3. A system according to claim 1, where the intermediary system determines whether the recommender is a new user and, if so, creates a referee record for the recommender and store it in the at least one database.

4. A system according to claim 3, where the referee record comprises the name and other identifying information of the recommender as well as a referral credit amount.

5. A system according to claim 4, where the identifying information includes a mobile phone number of the recommender and this operates as the primary key for the referee record.

6. A system according to claim 1, where the intermediary system negotiates directly with the merchant for the provision of the recommended good or service to the receiver following a successful recommendation.

7. A system according to claim 1, where the unique identification number is composed from the concatenation of a common short code, the reference code and the mobile phone number of the recommender.

8. A system according to claim 1, where the reference code for the good or service associated with the selected good or service is representative of the actual selected good or service.

9. A system according to any of claim 1 or 2-7,
where the reference code for the good or service associated with the selected good or service is representative of a subscription service associated with the actual selected good or service.

10. A system according to claim 1, where the referral record includes further information such as the electronic mail address or other identifier of the merchant who is to provide the recommended good or service.

11. A system according to claim 10, where the referral record includes details of the referral credit amount to be credited to the recommender on making a successful recommendation to the receiver.

12. A system according to claim 1, where the deeming of a recommendation as successful is achieved by referencing the corresponding referral record for the recommendation in the at least one database to determine the amount of applicable referral credit associated with the successful recommendation and crediting this amount to the referral credit amount of the recommender as recorded in the recommender's referee record.

13. A system according to claim 1, where the reference code is used in conjunction with one or more look-up tables to determine other information.

14. A system according to claim 13, where the other information includes merchant details and referral credit amounts.

15. A system according to claim 1, where the merchant system is a standalone computer system accessible by direct connection, an intranet accessible via a computer network, or a website accessible via the internet.

16. A system according to claim 1, where the communication messages sent by the intermediary system may take the form of Short Messaging System (SMS) messages or Multimedia Messaging System (MMS) messages or other like messaging protocols.

17. A system according to claim 1, where the method of communicating between the merchant system and the intermediary system is by way of electronic mail message or through web services or other like protocols.

18. A method for tracking the successful recommendation of a good or service comprising the steps of:
accessing, by a recommender, a merchant system to select and recommend to a receiver a good or service;
receiving a first communication message from the merchant system, the first communication message being sent in response to the selection and recommendation of the good or service by the recommender;
parsing, by an intermediary system, the first communication message to determine the mobile phone number allocated to a mobile phone of an intended receiver, a unique identifier of the recommender and a reference code for a good or service associated with the selected good or service;
creating, by an intermediary system, a new referral record including the unique identifier of the recommender, the mobile phone number allocated to the mobile phone of the intended receiver and the reference code for the recommended good or service;
storing, by the intermediary system, the referral record in the at least one database;
composing, by the intermediary system, a recommendation message recommending the recommended good or service;
sending the recommendation message to the mobile phone using a phone number having a unique identifier number;
receiving a reply having an appropriate acceptance response to the recommendation message responsive to the intended receiver taking up the recommended good or service;
deeming the recommendation successful;
wherein the intermediary system is in data communication with the at least one database and the merchant system and in communication with the mobile phone through a mobile telecommunications network.

19. A method according to claim 18, wherein the first communication message includes a referral credit amount.

20. A method according to claim 18, where the intermediary system determines whether the recommender is a new user and, if so, creates a referee record for the recommender and store it in the at least one database.

21. A method according to claim 20, where the referee record comprises the name and other identifying information of the recommender as well as a referral credit amount.

22. A method according to claim 21, where the identifying information includes a mobile phone number of the recommender and this operates as the primary key for the referee record.

23. A method according to claim 18, where the intermediary system negotiates directly with the merchant for the provision of the recommended good or service to the receiver following a successful recommendation.

24. A method according to claim 18, where the unique identification number is composed from the concatenation of a common short code, the reference code and the mobile phone number of the recommender.

25. A method according to claim 18, where the reference code for the good or service associated with the selected good or service is representative of the actual selected good or service.

26. A method according to any of claim 18 or 20-25, where the reference code for the good or service associated with the selected good or service is representative of a subscription service associated with the actual selected good or service.

27. A method according to claim 18, where the referral record includes further information such as the electronic mail address or other identifier of the merchant who is to provide the recommended good or service.

28. A method according to claim 27, where the referral record includes details of the referral credit amount to be credited to the recommender on making a successful recommendation to the receiver.

29. A method according to claim 18, where the deeming of a recommendation as successful is achieved by referencing the corresponding referral record for the recommendation in the at least one database to determine the amount of applicable referral credit associated with the successful recommendation and crediting this amount to the referral credit amount of the recommender as recorded in the recommender's referee record.

30. A method according to claim 18, where the reference code is used in conjunction with one or more look-up tables to determine other information.

31. A method according to claim 30, where the other information includes merchant details and referral credit amounts.

32. A method according to claim 18, where the merchant system is a standalone computer system accessible by direct connection, an intranet accessible via a computer network, or a website accessible via the internet.

33. A method according to claim 18, where the communication messages sent by the intermediary system may take the form of Short Messaging System (SMS) messages or Multimedia Messaging System (MMS) messages or other like messaging protocols.

34. A method according to claim 18, where the method of communicating between the merchant system and the intermediary system is by way of electronic mail message or through web services or other like protocols.

35. A non-transitory computer readable medium having recorded thereon software that when executed by one or more computer processors, performs a method for tracking the successful recommendation of a good or service, the method comprising the steps of:

accessing, by a recommender, a merchant system to select and recommend to a receiver the good or service;

receiving a first communication message from the merchant system, the first communication message being sent in response to the selection and recommendation of the good or service by the recommender;

parsing, by an intermediary system, the first communication message to determine the mobile phone number allocated to a mobile phone of an intended receiver, a unique identifier of the recommender and a reference code for a good or service associated with the selected good or service;

creating, by an intermediary system, a new referral record including the unique identifier of the recommender; the mobile phone number allocated to the mobile phone of the intended receiver and the reference code for the recommended good or service;

storing, by an intermediary system, the referral record in the at least one database;

composing, by an intermediary system, a recommendation message recommending the recommended good or service;

sending the recommendation message to the mobile phone using a phone number having a unique identifier number;

receiving a reply having an appropriate acceptance response to the recommendation message responsive to the intended receiver taking up the recommended good or service;

deeming the recommendation successful;

wherein the intermediary system is in data communication with the at least one database and the merchant system and in communication with the mobile phone through a mobile telecommunications network.

* * * * *